United States Patent
Lee et al.

(10) Patent No.: US 10,549,708 B2
(45) Date of Patent: Feb. 4, 2020

(54) AIR BELT APPARATUS FOR VEHICLE

(71) Applicants: Hyundai Motor Company, Seoul (KR); Kia Motors Corporation, Seoul (KR)

(72) Inventors: Soo-Chul Lee, Suwon-si (KR); Taeg-Young An, Suwon-si (KR); Jae-Soon Cho, Hwaseong-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 116 days.

(21) Appl. No.: 15/858,662

(22) Filed: Dec. 29, 2017

(65) Prior Publication Data

US 2018/0297547 A1    Oct. 18, 2018

(30) Foreign Application Priority Data

Apr. 18, 2017 (KR) .................. 10-2017-0049898

(51) Int. Cl.
*B60R 21/18* (2006.01)
*B60R 22/18* (2006.01)
*B60R 22/00* (2006.01)

(52) U.S. Cl.
CPC ........ *B60R 21/18* (2013.01); *B60R 2022/006* (2013.01); *B60R 2022/1843* (2013.01)

(58) Field of Classification Search
CPC ... B60R 21/18; B60R 22/30; B60R 2022/006; B60R 2022/1843
See application file for complete search history.

(56) References Cited

U.S. PATENT DOCUMENTS

| 2003/0159258 A1* | 8/2003 | Wetter | B60N 2/2812 24/633 |
| 2016/0214509 A1* | 7/2016 | Kitt | B60R 22/105 |
| 2017/0106828 A1* | 4/2017 | Isozaki | B60R 21/18 |

FOREIGN PATENT DOCUMENTS

| JP | 2010-036836 A | 2/2010 |
| JP | 2013-244857 A | 12/2013 |
| JP | 2016-002822 A | 1/2016 |
| KR | 10-2007-0070296 A | 7/2007 |
| WO | WO 2013/105639 A1 | 7/2013 |

OTHER PUBLICATIONS

Hiruta et al. JP 2010-36836A, Machine English translation, ip.com (Year: 2010).*

* cited by examiner

*Primary Examiner* — Karen Beck
(74) *Attorney, Agent, or Firm* — Morgan, Lewis & Bockius LLP (57) ABSTRACT

An air belt apparatus for a vehicle may include an air belt coupled to an inflator formed at a predetermined position in a seat back, the air belt being configured to be placed on a shoulder portion of a driver, and a seat belt including a webbing passing through the air belt, the webbing being extracted from a retractor spaced from the inflator with a predetermined distance.

7 Claims, 10 Drawing Sheets

AIR BELT APPARATUS FOR VEHICLE

CROSS-REFERENCE TO RELATED APPLICATIONS

The present application claims priority to Korean Patent Application No. 10-2017-0049898, filed on Apr. 18, 2017, the entire contents of which is incorporated herein for all purposes by this reference.

BACKGROUND OF THE INVENTION

Field of the Invention

The present invention relates to an air belt apparatus for a vehicle, and more particularly, to an air belt apparatus configured for a vehicle, which includes a sleeve through which a webbing passes such that a seat belt and an air belt are provided independently from each other, the sleeve having a hinge structure making it possible for a cushion to be smoothly placed on a curved surface of the chest of a user, and which prevents the webbing from being biased to one side thereof.

Description of Related Art

In general, a safety belt of a vehicle is a primary safety apparatus designed to protect an occupant during a collision and a sudden stop of the vehicle, and functions to keep the occupant positioned on a seat so that the occupant can be prevented from being ejected out of the vehicle by inertia, whereby the force of secondary impacts can be prevented from being applied to the occupant.

Typically, the safety belt is formed of a diagonal belt which is diagonally positioned over the shoulder and the chest of the occupant, and a horizontal belt which is horizontally positioned over the hip of the occupant.

Airbags of the vehicle are disposed to protect the body of the occupant by absorbing impacts to be applied to the occupant when a vehicle collision occurs. The airbags are disposed in a steering wheel and an instrument panel. When a vehicle collision is detected, a cushion filled with gas is released and inflated between the steering wheel and the occupant or between the instrument panel and the occupant, thus reducing secondary impacts to be applied to the occupant.

As one of among such airbag apparatuses, a belt airbag apparatus in which an airbag is provided on a seat belt of a vehicle is recently being developed in various forms.

Figure 1:
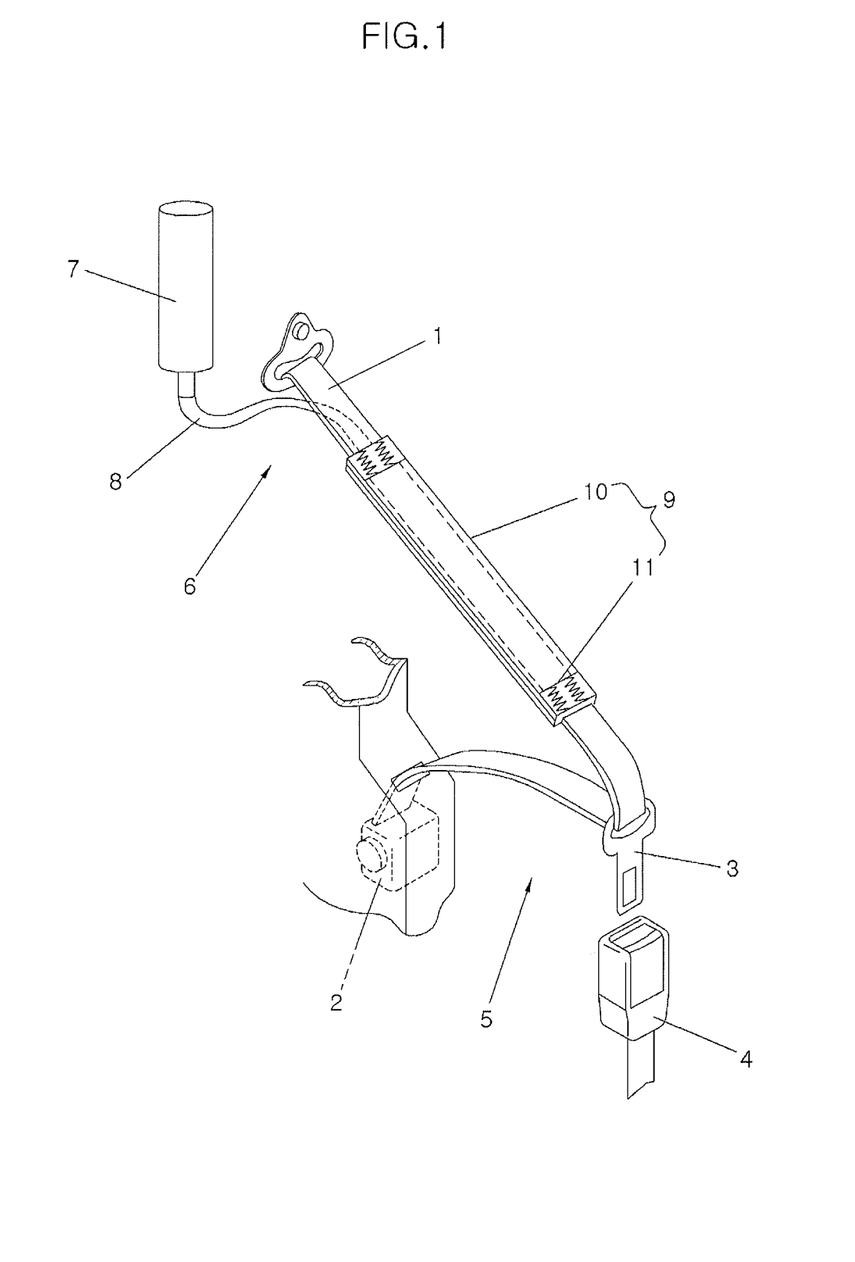
FIG. 1 is a schematic view illustrating an air belt for a vehicular safety belt according to a related art.

In FIG. 1, there is illustrated an air belt with a cover-integrated airbag cushion for vehicular safety belts according to a related art.

The air belt for vehicular safety belts according to the related art is formed of a safety belt 5 and an air belt 6. The safety belt 5 restrains the upper body of an occupant who is sitting on a seat by fastening a tongue 3 which is provided on a webbing 1 extracted from a retractor 2 which is disposed in a lower portion of a vehicle body pillar, to a buckle 4 which is provided on the vehicle body at one side of the seat. The air belt 6 includes: an inflator 7 disposed in an upper portion of the vehicle body pillar and configured such that ignition thereof is controlled by an airbag control unit (ACU) that may generate a control signal depending on the intensity of a vehicle collision; a flexible tube 8 coupled to the inflator 7; and an airbag device 9 which is fixed to the webbing 1 and is inflated and deployed from the webbing 1 by gas supplied from the flexible tube 8.

The air belt for vehicular safety belts according to the conventional art may solve a problem of difficulty in stitching a cover and the webbing to each other when the airbag cushion is separately manufactured. However, in the conventional air belt, because the airbag device 9 is fixed on the webbing 1, various body types of occupants cannot be taken into account when the airbag device 9 is placed on the curved surfaces of the chests of the occupants. Furthermore, when the airbag device 9 inflates, the webbing 1 may be biased to one side or press the chest of an occupant, so that a concentrated load may be applied to the occupant during a vehicle collision.

In the air belt for vehicular safety belts according to the conventional art, because the webbing is fixed at a position adjacent to the inflator, the occupant may not easily move his or her upper body while wearing the safety belt. Therefore, the air belt may inconvenience the occupant, thus reducing the perceived quality of the safety belt.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an air belt apparatus configured for a vehicle which may include a seat belt and an air belt provided independently from each other, and is configured such that, when the air belt inflates, a webbing striker prevents a webbing from being biased to one side thereof, and the webbing is rapidly raised from the shoulder portion of an occupant by a predetermined height, whereby deformation of the chest of the occupant may be markedly reduced, and the safety of the occupant may be ensured.

Other various aspects of the present invention can be understood by the following description, and become apparent with respect to the exemplary embodiments of the present invention. Also, it is obvious to those skilled in the art to which the present invention pertains that the objects and advantages of the present invention can be realized by the means as claimed and combinations thereof.

In accordance with exemplary embodiments of the present invention, there is provided an air belt apparatus configured for a vehicle including: an air belt coupled to an inflator formed at a predetermined position in a seat back, the air belt being configured to be placed on a shoulder portion of a driver; and a seat belt including a webbing passing through the air belt, the webbing being extracted from a retractor spaced apart from the inflator with a predetermined distance.

The air belt may include: a cushion device configured to be inflated and deployed by air supplied from the inflator; a sleeve through which the webbing passes; and webbing-passing holes formed in respective opposite end portions of the sleeve.

The sleeve may include a plurality of parts coupled with each other by a hinge.

The webbing may be allowed to be bent while passing through the webbing-passing holes.

Guide ribs and webbing strikers may be provided on an internal surface of one side of the sleeve, the guide ribs being configured to guide movement of the webbing, the webbing strikers being configured to control movement of the webbing when the air belt is operated.

The webbing strikers may be provided between the guide ribs, and each may protrude a height less than a height of each of the guide ribs.

The cushion device may include a first cushion provided over the sleeve, and a second cushion provided under the sleeve.

The second cushion may include a cushion fixing portion provided under the sleeve, and a cushion inflating portion provided under the cushion fixing portion and formed in a zig-zag shape.

When the air belt is operated, the cushion inflating portion may be inflated and raise the sleeve and the webbing.

The cushion inflating portion may include at least one or more cushion inflating parts provided under the cushion fixing portion.

The methods and apparatuses of the present invention have other features and advantages which will be apparent from or are set forth in more detail in the accompanying drawings, which are incorporated wherein, and the following Detailed Description, which together serve to explain predetermined principles of the present invention.

It may be understood that the appended drawings are not necessarily to scale, presenting a somewhat simplified representation of features illustrative of the predetermined principles of the invention. The predetermined design features of the present invention as disclosed wherein, including, for example, predetermined dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also alternatives, modifications, equivalents and other embodiments, which may be included within the spirit and scope of the invention as defined by the appended claims.

Exemplary embodiments of the present invention will be described below in more detail with reference to the accompanying drawings to be easily realized by those skilled in the art.

The present invention may, however, be embodied in different forms and should not be construed as limited to the exemplary embodiments set forth herein. In exemplary embodiments, irrelevant to the present invention may be omitted to avoid obscuring appreciation of the disclosure. Throughout the disclosure, like reference numerals refer to like parts throughout the various figures and embodiments of the present invention.

The drawings are not necessarily to scale and in some instances, proportions may have been exaggerated to clearly illustrate various layers and regions of the embodiments. It will be understood that when an element including a layer, a film, a region, or a plate is referred to as being "immediately above" another element, it can be "immediately above" the other element or intervening elements may also be present.

In contrast, when an element is referred to as being "above" another element, there are no intervening elements present. Furthermore, it will be understood that when an element is referred to as being "entirely" formed on another element, it can be formed on the entire surface (or whole surface) of the other element or cannot be formed at a portion of the edge portion thereof.

Figure 2A:
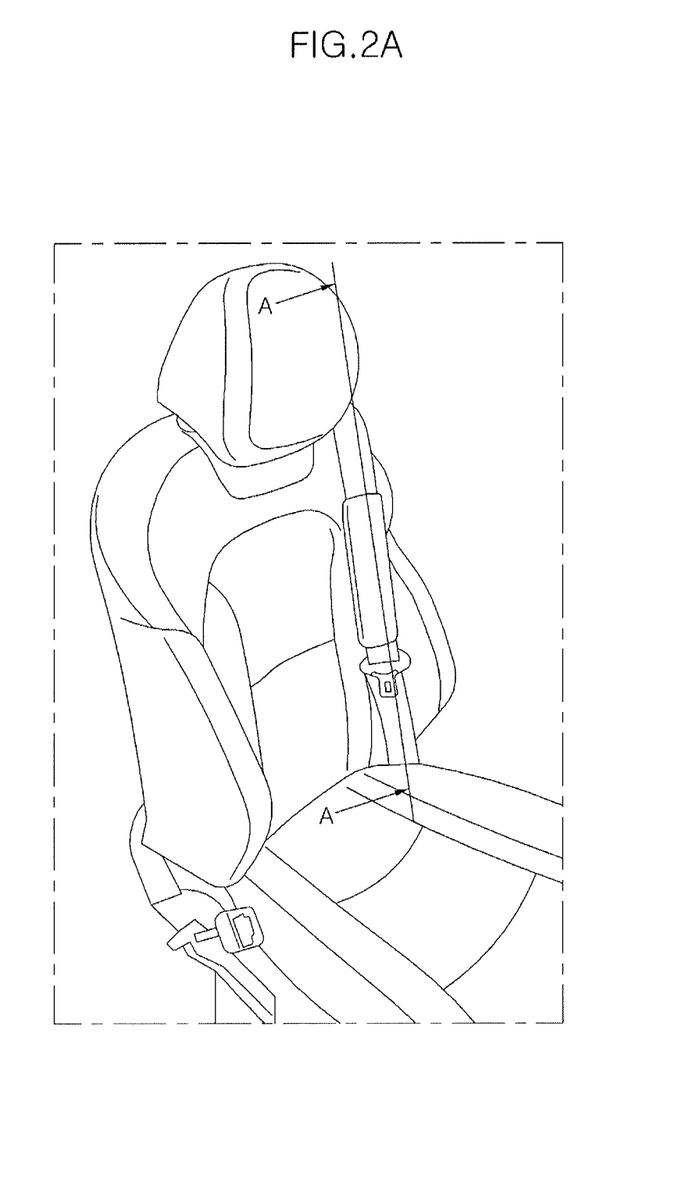
FIG. 2A and FIG. 2B are schematic views illustrating an air belt apparatus for vehicles according to an exemplary embodiment of the present invention.
Figure 2B:
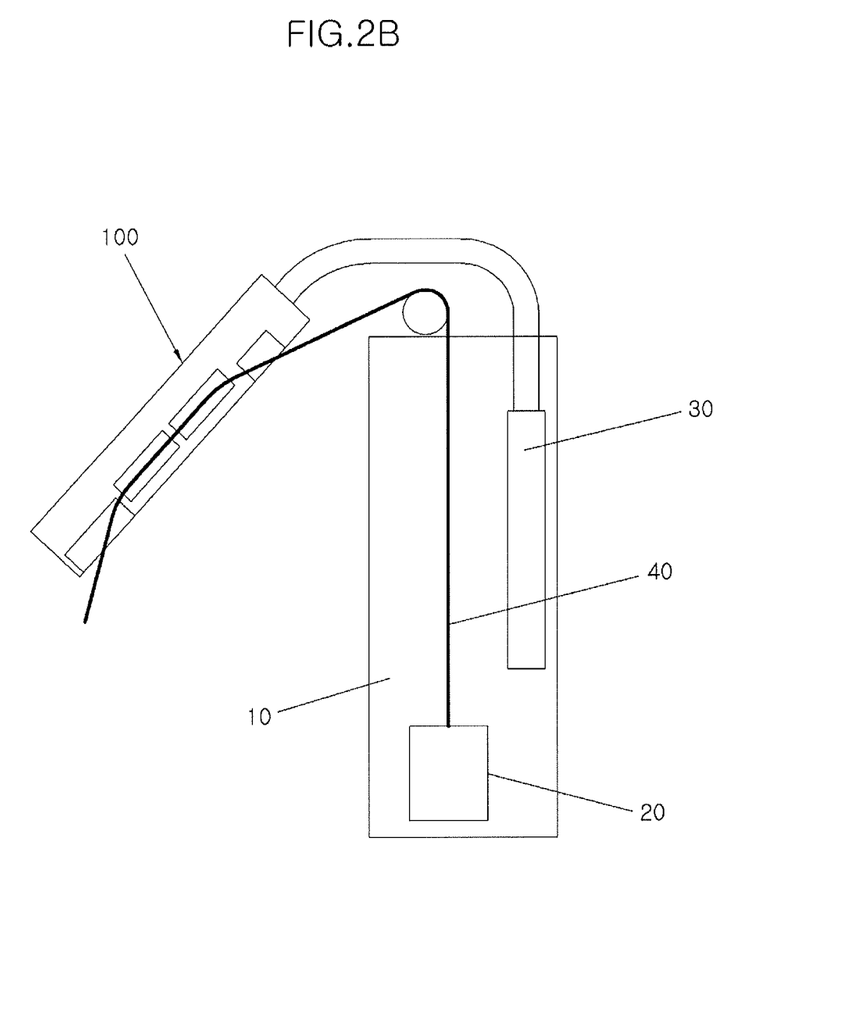

FIG. 2A and FIG. 2B are schematic views illustrating an air belt apparatus configured for vehicles according to an exemplary embodiment of the present invention.

Referring to FIG. 2A and FIG. 2B, the air belt apparatus configured for vehicles according to an exemplary embodiment of the present invention may include an air belt 100 and a seat belt 20 and 40.

FIG. 2B is a sectional view of the seat taken along line A-A of FIG. 2A, and illustrates a seat back 10, a retractor 20, an inflator 30, a webbing 40 and the air belt 100.

The retractor 20 is provided at a predetermined position in the seat back 10 and allows the webbing 40 to be extracted. The retractor 20 may be disposed at a position spaced from the inflator 30 with a predetermined distance. The retractor 20 may be provided at various positions in the vehicle when the seat belt and the air belt can be respectively provided in spaces independent from each other.

The inflator 30 is provided to generate an airbag gas, and is controlled by an airbag control unit (ACU). The inflator 30 is provided at a position spaced from the retractor 20 with a predetermined distance.

A first end portion of the webbing 40 is extracted from or retracted into the retractor 20. The webbing 40 may pass through an air belt 100 and be removably fastened to a buckle formed on one side of the seat back, using a tongue formed on a second end portion of the webbing 40.

The air belt 100 is coupled to the inflator 30 formed at a predetermined position in the seat back, and is placed on the shoulder portion of a driver. The term "shoulder part" is a concept including the shoulder portion and the chest portion of a driver or a passenger.

In an exemplary embodiment of the present invention, the seat belt and the air belt are independently provided. Consequently, the present invention may solve the problems of the conventional art which inconveniences the driver or the passenger when the seat belt is extracted from a lower anchor and is fastened. Accordingly, the perceived quality of the air belt apparatus configured for the vehicle may be improved.

Figure 3A:
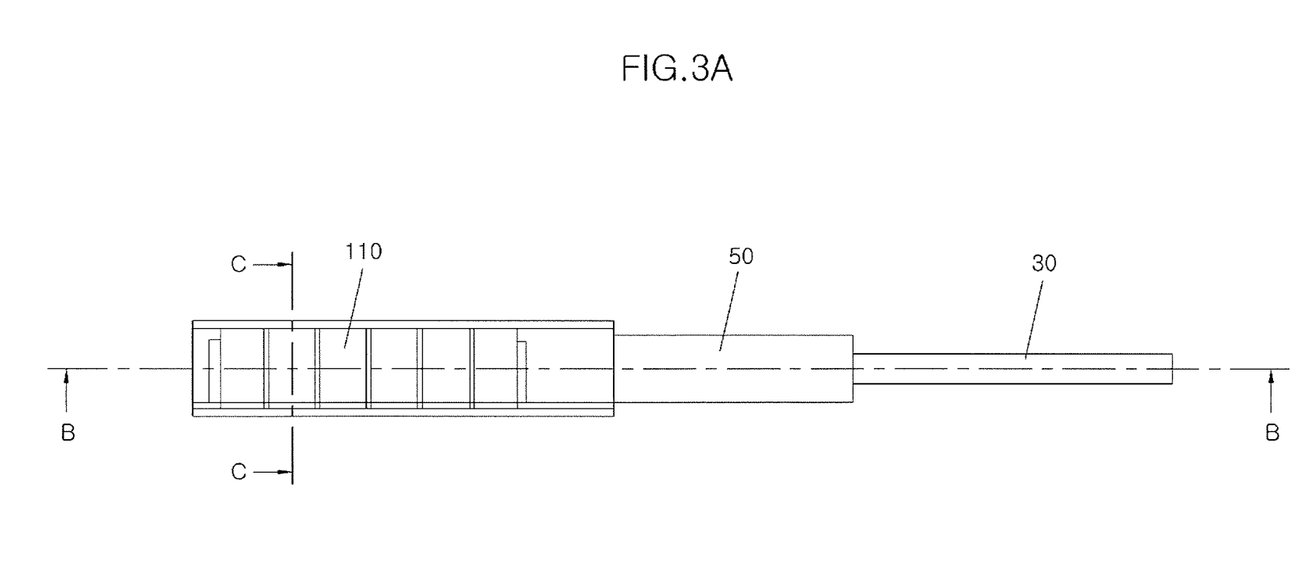
FIG. 3A is a plan view illustrating an air belt apparatus for vehicles according to an exemplary embodiment of the present invention.
Figure 3B:
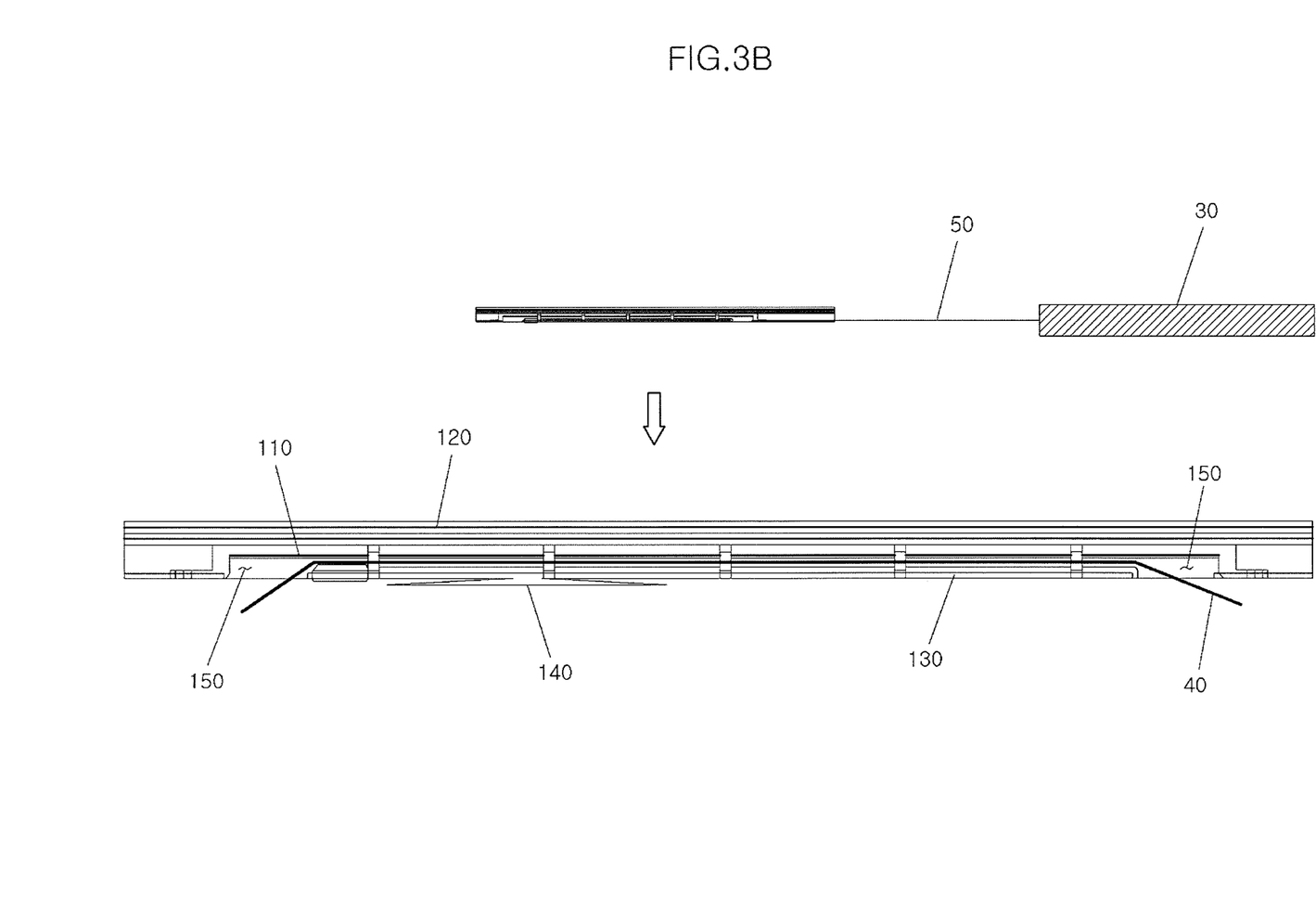
FIG. 3B is a side view illustrating the air belt apparatus for vehicles according to an exemplary embodiment of the present invention.
Figure 3C:
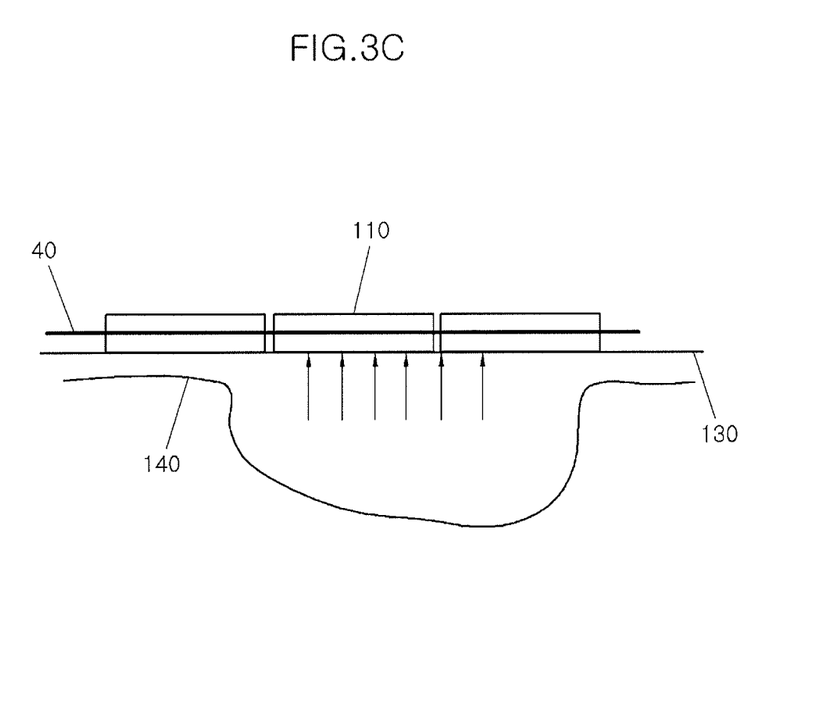
FIG. 3C is a schematic view illustrating the state of a second cushion when inflated, according to an exemplary embodiment of the present invention.
Figure 4A:
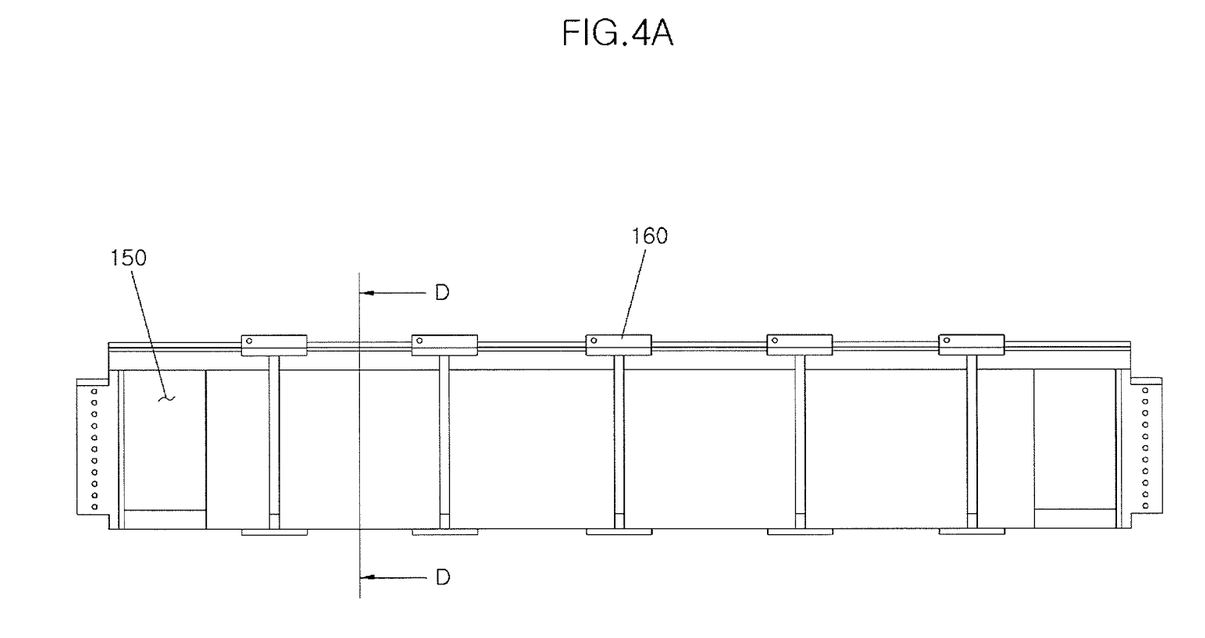
FIG. 4A and FIG. 4B are views illustrating a sleeve according to an exemplary embodiment of the present invention.
Figure 4B:
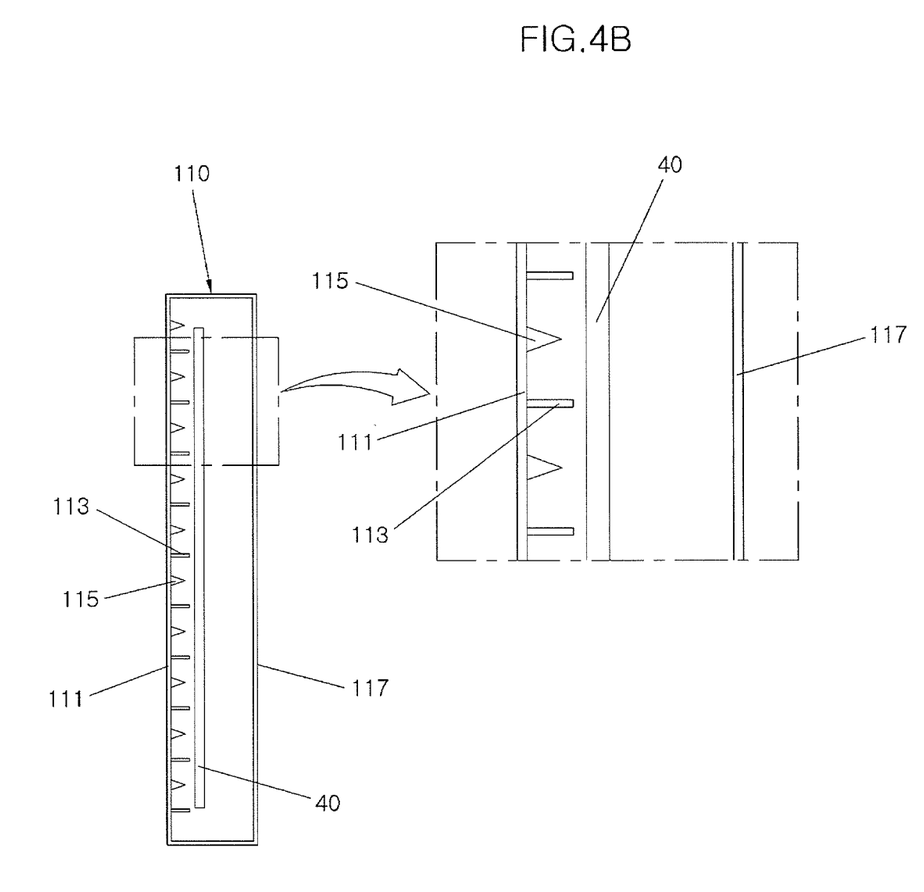

FIG. 3A is a plan view illustrating the air belt apparatus configured for vehicles according to an exemplary embodiment of the present invention. FIG. 3B is a side view illustrating the air belt apparatus configured for vehicles according to an exemplary embodiment of the present invention. FIG. 3C is a schematic view illustrating the state of a second cushion when inflated, according to an exemplary embodiment of the present invention. FIG. 4A and FIG. 4B are views illustrating a sleeve according to an exemplary embodiment of the present invention.

Referring to FIGS. 3A to 4B, the air belt 100 according to an exemplary embodiment of the present invention includes a cushion device 120, 130, and 140 which is inflated and deployed by gas supplied from the inflator 30, a sleeve 110 through which the webbing 40 passes, and webbing-passing holes 150 which are formed on respective opposite end portions of the sleeve 110.

FIG. 3B illustrates a longitudinal section taken along line B-B of FIG. 3A. The air belt 100 is formed to receive gas from a connection tube 50 extending from the inflator 30, and the enlarged view in FIG. 3B shows the air belt 100 combined with the webbing 40.

The cushion device 120, 130, and 140 includes a first cushion 120 provided over the sleeve 110, and a second cushion 130, 140 provided under the sleeve 110.

The first cushion 120 is provided over the sleeve 110 and the webbing 40. When the ACU operates the inflator 30 during a vehicle collision, the first cushion 120 inflates to reduce the impact to be applied to a side portion of the head of an occupant (the driver or the passenger), thus protecting the occupant.

The second cushion 130 and 140 includes a cushion fixing portion 130 formed under the sleeve 110, and a cushion inflating portion 140 formed in a zig-zag shape under the cushion fixing portion 130.

The cushion fixing portion 130 is attached to a lower surface of the air belt 100, and maintained in an original shape thereof even when the air belt 100 is operated.

When the air belt 100 is operated, the cushion inflating portion 140 inflates, so that the sleeve 110 and the webbing 40 are moved upward.

In other words, the cushion inflating portion 140 is folded in a zig-zag shape under normal conditions, as shown in FIG. 3B. When an event including a vehicle collision occurs, the cushion inflating portion 140 inflates to effectively elevate the webbing 40 from the shoulder portion of the occupant.

In the air belt of the conventional art, because a cushion is formed such that upper and lower portions of the sleeve are enclosed by the cushion, the webbing cannot be raised from the chest of the occupant when a vehicle collision occurs, and rather the air belt inflates in directions in which the webbing is not present, whereby the webbing may be biased to one side or press the chest of the occupant, thus applying a concentrated load to the occupant.

In an exemplary embodiment of the present invention, the second cushion is provided under the air belt. Thus, when a vehicle collision occurs, the second cushion rapidly raises the webbing from the shoulder portion of the occupant by a predetermined height. Consequently, deformation of the chest of the occupant during the collision may be markedly reduced, whereby the safety of the occupant may be ensured.

The cushion inflating portion 140 may include at least one cushion inflating portion provided under the cushion fixing portion 130.

The webbing-passing holes 150 are formed in respective lower portions of the opposite end portions of the sleeve 110 that integrally extends.

The webbing 40 passes through the sleeve 110 in a linear or curved shape, and is allowed to be rapidly bent outside the webbing-passing hole 150.

According to an exemplary embodiment of the present invention, the air belt may be easily moved along the webbing or fixed at a desired position. Furthermore, the air belt may remain disposed at a position configured for giving comfort to the occupant. Consequently, the perceived quality of the air belt may be.

Referring to FIG. 4A, the sleeve 110 of the air belt apparatus configured for the vehicle according to an exemplary embodiment of the present invention includes a plurality of parts coupled with each other by a hinge 160.

Thanks to the hinge 160, the sleeve 110 may be placed on the shoulder portion of the occupant in the form corresponding to a curved shape of the shoulder portion.

Referring to FIG. 4B which is a cross-sectional view taken along line D-D of FIG. 4A, guide ribs 113 and webbing strikers 115 are provided on an internal surface of one side of the sleeve 110. The guide ribs 113 are configured to guide movement of the webbing 40, and the webbing strikers 115 are configured to control movement of the webbing 40 when the air belt is operated.

The webbing strikers 115 are provided between the guide ribs 113, and each protrudes a height less than that of each guide rib 113.

Due to the present structure, when the air belt is operated, the guide ribs 113 are compressed by a load applied to the webbing, and the webbing strikers 115 restrict lateral movement of the webbing. As a result, the webbing may be prevented from being biased to one side thereof, and be reliably raised even when a relatively low pressure is applied from the cushion to the webbing.

Figure 5A:
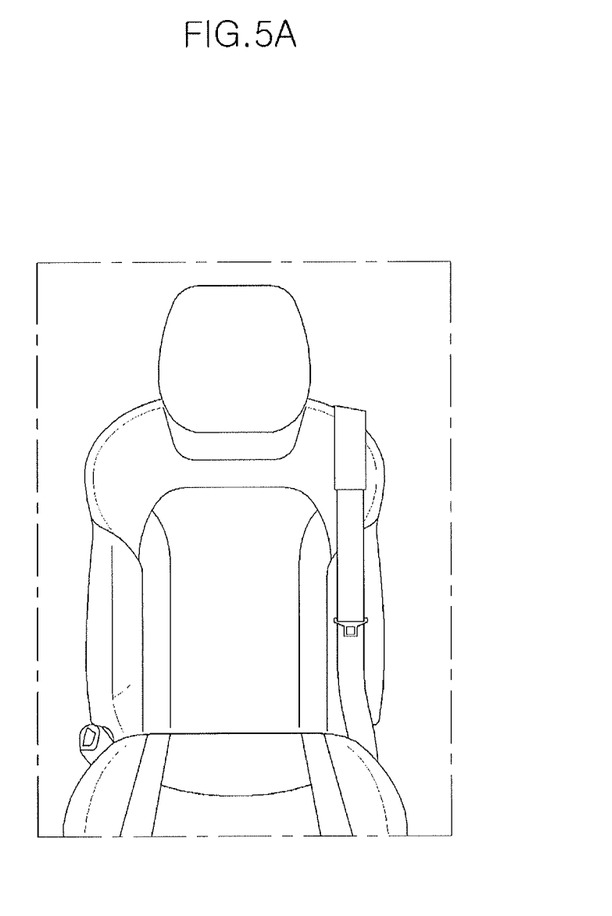
FIG. 5A and FIG. 5B are respectively views illustrating a released state and a fastened state of the air belt apparatus for vehicles according to an exemplary embodiment of the present invention.
Figure 5B:
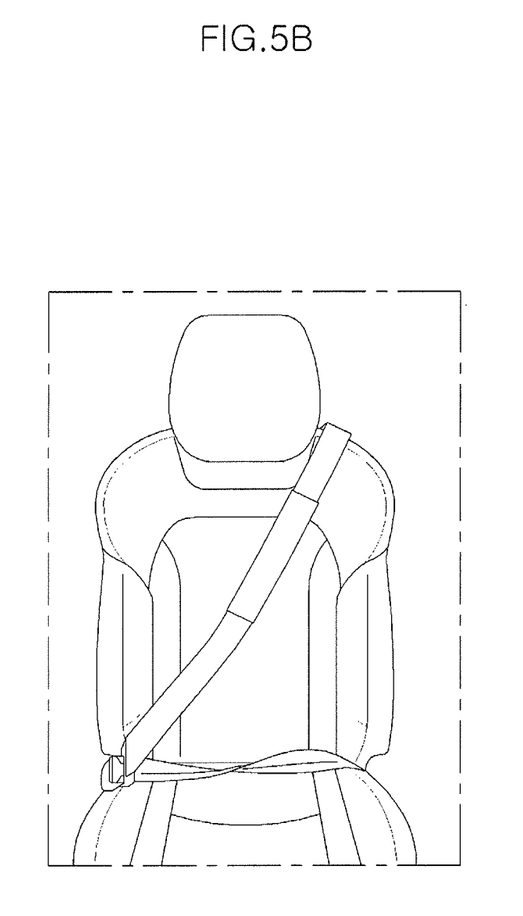

FIG. 5A and FIG. 5B are views illustrating a released state and a fastened state of the air belt apparatus configured for vehicles according to an exemplary embodiment of the present invention.

As shown in FIG. 5A, the air belt apparatus configured for vehicles is disposed on one side of the seat back before the seat belt is fastened. However, when the seat belt is fastened, the air belt moves to the shoulder portion or the chest of the occupant, thus making it possible for the webbing of the seat belt to smoothly move. Accordingly, the perceived quality of the seat belt may be improved.

According to an exemplary embodiment of the present invention, a seat belt and an air belt are independently provided. Consequently, the present invention may solve the problems of the conventional art which inconveniences the driver or the passenger when the seat belt is extracted from a lower anchor and is fastened. Accordingly, the perceived quality of the air belt apparatus configured for the vehicle may be improved.

According to an exemplary embodiment of the present invention, the second cushion is provided under the air belt. Thus, when a vehicle collision occurs, the second cushion can rapidly raise the webbing from the shoulder portion of the occupant by a predetermined height. Consequently, deformation of the chest of the occupant may be markedly reduced, whereby the safety of the occupant may be ensured.

According to an exemplary embodiment of the present invention, when the air belt is operated, the guide ribs 113 are compressed by a load applied to the webbing, and the webbing strikers 115 restrict lateral movement of the webbing. As a result, the webbing may be prevented from being biased to one side thereof, and be reliably raised even when a relatively low pressure is applied from the cushion to the webbing.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with respect to the positions of such features as displayed in the figures.

The foregoing descriptions of predetermined exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain predetermined principles of the invention and their practical application, to be configured for others skilled in the art to make and utilize exemplary embodiments of the present invention, as well as alternatives and modifications thereof. It is intended that the scope of the invention be defined by the Claims appended hereto and their equivalents.

What is claimed is:

1. An air belt apparatus for a vehicle comprising:
   an air belt coupled to an inflator formed at a predetermined position in a seat back, the air belt being configured to be disposed on a shoulder portion of a driver, and
   a seat belt including a webbing passing through the air belt, the webbing being extracted from a retractor spaced from the inflator with a predetermined distance,
   wherein the air belt includes:
      a cushion device configured to be inflated and deployed by air supplied from the inflator;
      a sleeve through which the webbing asses; and
      webbing-passing holes formed in respective opposite end portions of the sleeve,
   wherein guide ribs and webbing strikers are provided on an internal surface of a first side of the sleeve, the guide ribs being configured to guide movement of the webbing, the webbing strikers being configured to control a movement of the webbing when the air belt is configured to be operated,
   wherein the guide ribs and the webbing strikers are provided with a predetermined gap therebetween, and
   wherein the webbing strikers are mounted between the guide ribs, and each of the webbing strikers is protrudingly formed at a height less than a height of each of the guide ribs.

2. The air belt apparatus according to claim 1, wherein the sleeve includes a plurality of parts coupled with each other by a hinge.

3. The air belt apparatus according to claim 1, wherein the webbing is configured to be bent while passing through the webbing-passing holes.

4. The air belt apparatus according to claim 1, wherein the cushion device includes:
   a first cushion provided over the sleeve; and
   a second cushion provided under the sleeve.

5. The air belt apparatus according to claim 4, wherein the second cushion includes:
   a cushion fixing portion provided under the sleeve; and
   a cushion inflating portion provided under the cushion fixing portion and formed in a zig-zag shape.

6. The air belt apparatus according to claim 5, wherein, when the air belt is configured to be operated, the cushion inflating portion is inflated and raises the sleeve and the webbing.

7. The air belt apparatus according to claim 5, wherein the cushion inflating portion includes at least one or more cushion inflating parts provided under the cushion fixing portion.

* * * * *